UNITED STATES PATENT OFFICE.

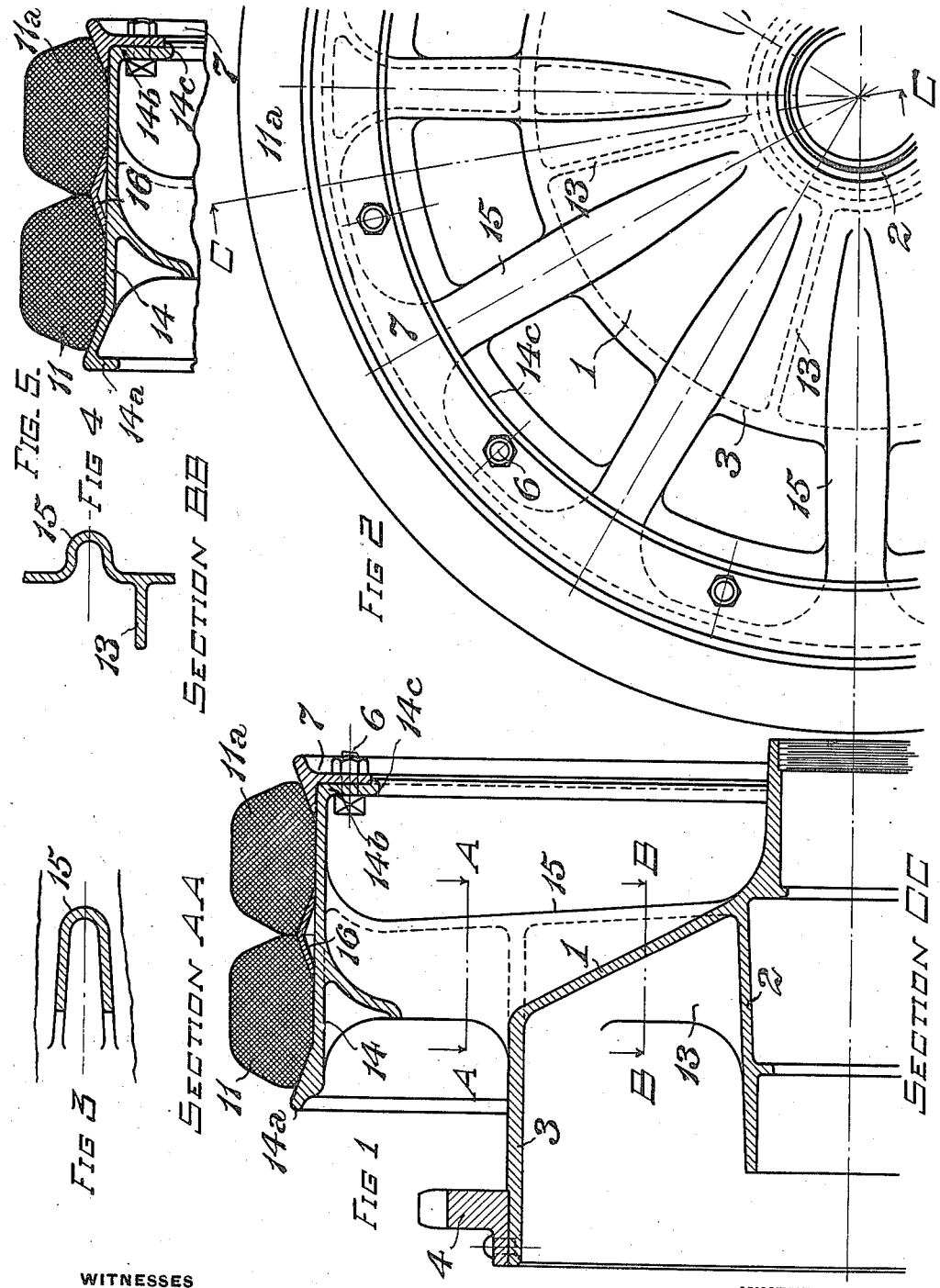

CHARLES L. HEISLER, OF SCHENECTADY, NEW YORK.

WHEEL FOR VEHICLES.

1,092,573. Specification of Letters Patent. Patented Apr. 7, 1914.

Application filed May 27, 1912. Serial No. 699,849.

*To all whom it may concern:*

Be it known that I, CHARLES L. HEISLER, of Schenectady, in the county of Schenectady and State of New York, have invented a certain new and useful Improvement in Wheels for Vehicles, of which improvement the following is a specification.

My invention relates to wheels for road vehicles, and more particularly to those used in automobile trucks, and its object is to provide a wheel of such class which shall be of simple, strong, and inexpensive construction.

The improvement claimed is hereinafter fully set forth.

In the accompanying drawings: Figure 1 is a half longitudinal section through a vehicle wheel embodying my invention, on the line C C of Fig. 2; Fig. 2, a partial front view, in elevation, of the same; Figs. 3 and 4, transverse sections, on the lines A A and B B respectively, of Fig. 1; and Fig. 5, a longitudinal section through the rim, showing a modification of structural detail.

The leading and characteristic features of my present invention are described and shown, but not claimed, in an application for Letters Patent filed by me February 5, 1912, Ser. No. 675,479.

In the practice of my invention, I provide a metal wheel, comprising a hub, 2, a rim, 14, and a plurality of spokes, 15, of U section, connecting the hub and rim, and integral therewith. A rearwardly extending conical flange, 1, is formed on the hub, 2, said flange being integral with, and interposed between, the spokes, 15, and having a plurality of radial ribs, 13, on its inner side, each located between two adjoining spokes. The conical flange, 1, is provided for the purpose of strengthening the wheel and supporting a drum, 3, which extends rearwardly from its rear end, and may be either integral with it, as shown, or detachably secured to it by bolts. The surface of the drum serves as a bearing face for a brake shoe of any suitable and preferred form, which is suspended and actuated in the ordinary manner, and which, as it is familiar to those skilled in the art to which my invention relates, and does not, in and of itself, form part thereof, is not herein shown. The drum, 3, also serves, when desired, as a seat for a driving gear, 4, which may be secured on its periphery, at or adjacent to its rear end, by rivets or bolts.

An integral flange, 14$^a$, is formed on the rear end of the rim, 14, and an inwardly extending flange, 14$^b$, is formed on its front end, said flange having an annular lip or shoulder, 14$^c$, on its face nearer the front of the wheel. The periphery of the rim is outwardly beveled or inclined, from its otherwise cylindrical portion, to the flange, 14$^a$, in order to provide a corresponding conical bearing surface, and, in connection with the flange, 14$^a$, to impart increased strength and rigidity to the rim, the better to resist shocks from obstacles in the roadway and the severe side thrust of detachable tires, which thrust, as is well understood, is greatest at the rear flanges of wheels of this general type. This resistance has heretofore been opposed by a separate conical flange, held in place by bolts, when using detachable tires. As shown in Fig. 1, the metal of the rim is thickened on its conical portion, and the rear flange, 14$^a$, extends outwardly, and, as shown in Fig. 5, the rim is of substantially uniform thickness and the flange, 14$^a$, is inwardly extended.

A facing ring, 7, which is flared outwardly at its periphery, is fitted around the lip, 14$^c$, and against the inwardly extending flange, 14$^b$, of the rim, to which it is secured by a plurality of clamping bolts, 6, parallel with the axial line of the wheel, which bolts are required to resist only the side tire thrust, which is small, compared with that acting on the integral rear flange, and when the wheel is designed to be fitted with detachable tires, the periphery of the facing ring is beveled or inclined toward the periphery of the rim, similarly to the rear flange, 14$^a$. Two tires, 11, 11$^a$, of any suitable and preferred construction, are fitted around the rim, 14, between the flange, 14$^a$, thereof, and the facing ring, 7, which latter serves to protect the rim from injury when striking a curb or other obstruction, as well as to hold the tire from lateral displacement. A loose metallic tire, 16, of triangular section, is fitted around the middle portion of the rim, 14, when the detachable tires are used.

I claim as my invention and desire to secure by Letters Patent:

1. In a vehicle wheel, the combination of a hub, a rim, a plurality of spokes integral with said hub and rim, and a conical flange formed on and extending rearwardly around said hub said flange being integral with said spokes and hub.

2. In a vehicle wheel, the combination of a hub, a rim, a plurality of spokes integral with said hub and rim, a conical flange formed on and extending rearwardly around said hub, and a drum extending rearwardly from said conical flange and presenting a bearing for a brake shoe on its surface said flange being integral with said spokes, hub and drum.

3. In a vehicle wheel, the combination of a hub, a rim, a plurality of spokes integral with said hub, a conical flange formed on and extending rearwardly around said hub and between said spokes, and a drum extending rearwardly from said conical flange and integral therewith.

4. In a vehicle wheel, the combination of a hub, a rim, a plurality of spokes connecting the hub and rim, a conical flange formed on and extending rearwardly around the hub and between the spokes, and a drum extending rearwardly from said conical flange, said drum being integral with the hub, rim, spokes and flange.

5. In a vehicle wheel, the combination of a hub, a rim, a plurality of spokes integral with said hub and rim, a conical flange formed on and extending rearwardly around said hub and between said spokes, and a plurality of radial ribs extending from the hub to said conical flange, between said spokes.

6. In a vehicle wheel, the combination of a hub, a rim, a plurality of spokes of U section integral with said hub and rim, and a conical flange formed on and extending rearwardly around said hub and between said spokes.

CHARLES L. HEISLER.

Witnesses:
 I. Taylor,
 E. I. Schauber.